United States Patent [19]

Gagnon

[11] Patent Number: 4,464,018
[45] Date of Patent: Aug. 7, 1984

[54] LIQUID CRYSTAL LIGHT VALVE IMAGE PROJECTION SYSTEM WITH COLOR SELECTIVE PREPOLARIZATION AND BLUE MIRROR

[75] Inventor: Ralph J. Gagnon, Chico, Calif.

[73] Assignee: Hughes Aircraft Company, El Segundo, Calif.

[21] Appl. No.: 334,676

[22] Filed: Dec. 28, 1981

[51] Int. Cl.³ .......................... G02F 1/13; G02F 1/00; H04N 9/31
[52] U.S. Cl. ................................ 350/331 R; 358/61; 350/342; 350/401; 350/403; 350/408
[58] Field of Search ................. 350/331 R, 345, 342, 350/401, 403, 408; 362/30, 33, 36, 37; 358/60, 61

[56] References Cited

U.S. PATENT DOCUMENTS

| | | | |
|---|---|---|---|
| 3,497,283 | 2/1970 | Law | 350/408 |
| 4,018,509 | 4/1977 | Boswell et al. | 350/342 |
| 4,124,278 | 11/1978 | Grinberg et al. | 350/342 |
| 4,191,456 | 3/1980 | Hong et al. | 350/342 X |
| 4,343,535 | 8/1982 | Bleha | 350/342 |
| 4,345,258 | 8/1982 | Tsai et al. | 353/31 X |

*Primary Examiner*—John K. Corbin
*Assistant Examiner*—David Lewis
*Attorney, Agent, or Firm*—William J. Benman, Jr.; William J. Bethurum; Anthony W. Karambelas

[57] ABSTRACT

An optical system is disclosed which incorporates a color selective prepolarizer to improve contrast and reduce stress induced birefringence while allowing a blue mirror to be used to enhance the projected image. The invention includes a source lamp for providing a first beam of unpolarized white light energy; a prepolarizing beam splitter which extracts from the first beam, second and third beams. The second beam contains undesirable color components of a first polarization state, which are removed from the system by reflection to an optical dump. The third beam includes prepolarized light of one color and the first polarization and white light of the second polarization. A main polarizing prism is provided for splitting the third beam into fourth and fifth beams having the first and second polarizing states respectively. The main prism effectively directs the white light to the light valve where it is modulated and returned to the main prism for projection in the conventional manner. The fifth beam being monochromatic and of the first polarization state is directed to the blue mirror where it is filtered to remove residual red and green components, altered in polarization state from the first state to the second state and altered in intensity by a preselected gradient operator before being returned to the main prism for superimposition on the light valve image. The invention includes projection optics for displaying the composite image.

1 Claim, 1 Drawing Figure

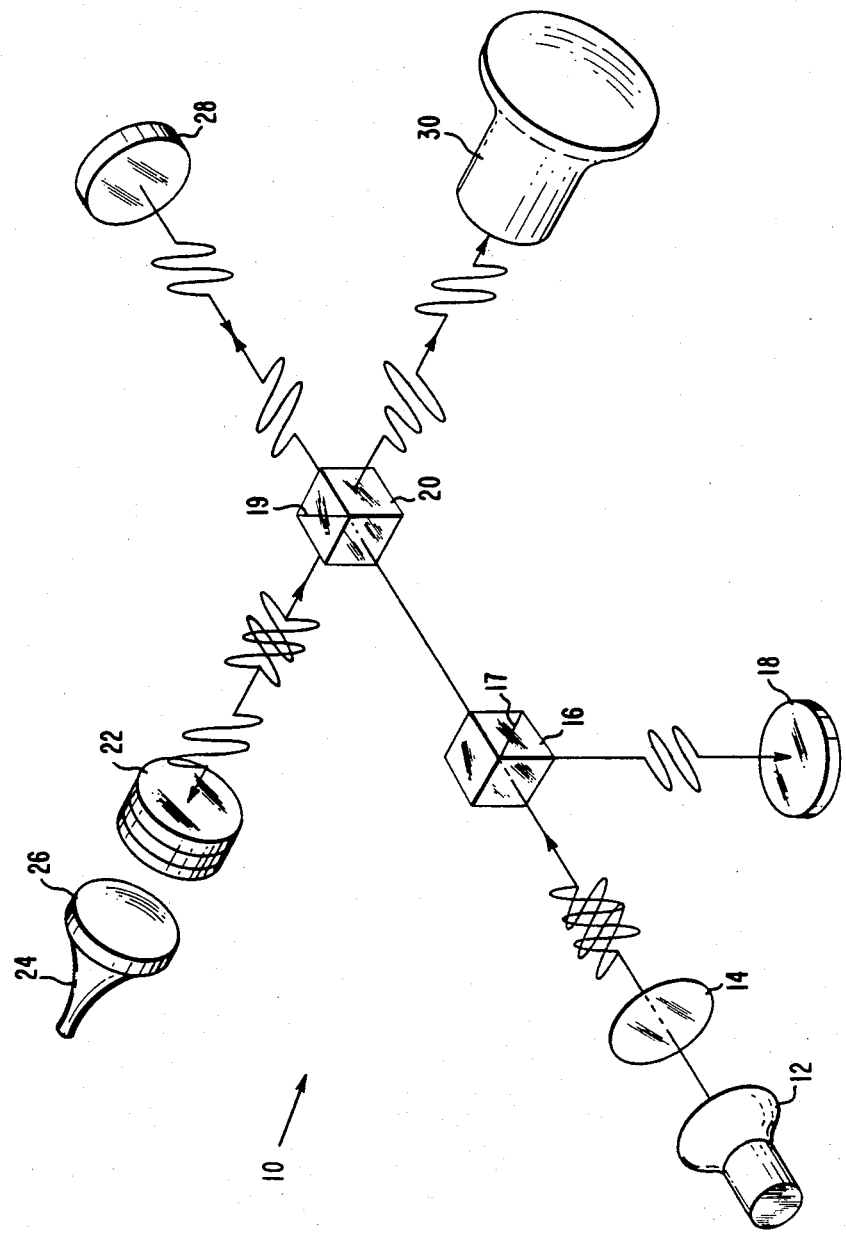

LIQUID CRYSTAL LIGHT VALVE IMAGE PROJECTION SYSTEM WITH COLOR SELECTIVE PREPOLARIZATION AND BLUE MIRROR

BACKGROUND OF THE INVENTION

1. Field of the Invention

This invention relates to liquid crystal light valve (LCLV) projectors. Specifically, this invention relates to apparatus for improving the performance of such projectors.

While the present invention will be described herein with reference to a particular embodiment, it is understood that the invention is not limited thereto. Those having ordinary skill in the art and access to the teachings of this invention will recognize additional embodiments and applications within the scope thereof.

2. Description of the Prior Art

The development of the liquid crystal light valve has opened the door to substantial progress in the state of the art of high quality large screen projectors. The reflective mode liquid crystal light valve is a thin, multilayer structure comprising a liquid crystal layer, a dielectric mirror, a light blocking layer, and a photoresponsive sandwiched between two transparent electrodes. A polarized projection beam is directed through the liquid crystal layer onto the dielectric mirror. An input image of low intensity light, such as that generated by cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirror is polarization modulated in accordance with the information incident on the photoconductor. Therefore, if a large complex distribution of light, for example, a high resolution input image, is focused onto the photoconductive surface, the device converts the image into a replica which can be projected with magnification to produce a high brightness image on a viewing screen. U.S. Pat. No. 4,019,807 issued to D. D. Boswell et al on Apr. 26, 1977, discloses such a high performance reflective mode liquid crystal light valve.

A graphics display projector using a liquid crystal light valve of the above type is described in an article entitled "An Application of the Liquid Crystal Light Valve to a Large Screen Graphics Display", published in the 1979, SOCIETY FOR INFORMATION DISPLAY (SID), International Symposium, Digest of Technical Papers, May 1979, pp. 22-23. This display system, a type which the present invention is particularly but not exclusively concerned, projects a large scale image having yellow-white characters on a dark blue background. The invention includes a cathode ray tube (CRT) which provides input imagery; projection optics which provide the bright collimated output beam and necessary light polarization; and the liquid crystal light valve which interfaces the input and output functions.

The system uses a powerful light source such as a xenon arc lamp to illuminate the liquid crystal light valve through collimating and polarizing optics. The light emitted from the xenon arc lamp is transmitted to a main polarizing prism where it is separated into 'S' and 'P' components. The P component passes through the prism while the S component is reflected toward the light valve. Information displayed by the cathode ray tube is transferred by fiber optics to one side of the light valve which changes the polarization state from S to P. The light is then transmitted through the prism and imaged on the screen by a projection lens. In this capacity, the main prism functions as an analyzer, converting modulations of polarization to modulations of brightness or intensity.

As mentioned above, this system is typical of prior art liquid crystal light valve projection systems in that it projects a large scale image having yellow-white alpha numeric characters on a blue background. The colors are a result of the unavoidable fact that the liquid crystal material polarization modulates the white projection light incident upon it as a function of the wavelength of the light. Although providing an image of high brightness and resolution, the system has several inherent drawbacks. For example, since the light valve is a complicated, expensive device that includes numerous microscopic thin film layers deposited on a superflat substrate, each requires a series of critical manufacturing steps. One of which requires that the two substrates which sandwich the ultra thin liquid crystal layer be polished to an optical flatness of better than ¼ the wavelength of white light or 0.15 micrometers. The light valves have a complicated molecular composition of rod-like liquid crystal molecules that are arranged in chains which are precisely oriented in twist and tilt angles relative to the substrates. In addition, the device must be assembled so that two optically flat substrates are uniformly separated from point to point to within a fraction of a micrometer.

The difficulty of producing such complicated structures within the required tolerances results in a large percentage of defective light valves. The variations in the liquid crystal layer thickness caused by both surface waviness and wedging of the substrate surfaces which contain the liquid crystal material, create poor uniformity of the image background color. Non-uniform twist and tilt of the liquid crystal molecules in their off-state also gives rise to color non-uniformities in the image background.

An additional cause of such uneven color is residual birefringence within the polarizing beam splitter. This residual birefringence can occur from manufacturing imperfections as well as from non-uniform heating by heat sources within the image projector package including the electronics as well as the high intensity light source.

Yet another shortcoming is due to the strong dependence of the background color on liquid crystal layer thickness. That is, the desirable color contrast of yellow characters on a blue background is achieved only by using a relatively thick liquid crystal layer of from approximately 6 to 8 micrometers. Because the response time of the liquid crystal layer varies as the square of its thickness, the blue color is achieved at the expense of frequency response. That is, as the thickness is increased to improve background, the rate at which unsmeared video images can be displayed decreases. Thus, although unsmeared video rate images can be produced with a thinner liquid crystal layer (e.g., 3 to 4 micrometers), the background may appear as an undesirable black color. This, when combined with yellow characters, gives a relatively low visually unpleasing color contrast. Finally, the blue background can vary in shade from device to device.

These defects which result in color variations, nonuniformity, and inconsistency can be redressed somewhat by using a special blue mirror to superimpose a spatially graded blue background over the light valve image. The special blue mirror will typically include a blue filter, a quarterwave plate, a spatially graded neutral density filter, and a mirrored reflective surface. A composite beam is thus projected by a lens onto a screen so as to superimpose the second beam onto the output image. The color of the second beam is selected so as to mask the color variations and improve the contrast of the output image. The graded intensity filter is selected to compensate for background brightness variations.

While the light valve operates on one channel, i.e., the S polarized light, the blue mirror operates on the other channel, i.e., the P polarized light. This, however, presents an additional difficulty. That is, the quality of the projected image, being generally a function of brightness, resolution and contrast, can be improved substantially by placing a prepolarizing prism in the optical path in front of the main polarizing prism. The prepolarizing prism substantially overcomes deficiencies in the main polarizing prism insofar that it aids in the transmission of light of one polarization and in reflection of light of another polarization. In addition, the prepolarizing prism is helpful in reducing heat generated stress in the main prism due to energy passing therethrough. (This is a problem that is exacerbated even further where a blue mirror is used insofar as the blue mirror requires and causes more energy to pass through the main prism.)

However, if the prepolarizing prism is used in the conventional manner to delete light of one polarization, the blue mirror cannot be used. This is because, as mentioned above, the blue mirror relies on the second channel to provide a second beam which enhances the projected image. Thus, it has been found desirable to provide a liquid crystal light valve projector which allows a blue mirror to be used while securing the advantages of prepolarization.

SUMMARY OF THE INVENTION

The shortcomings of the prior art are substantially overcome by the system of the present invention. The invention is an optical system which incorporates a color selective prepolarizer to improve contrast and reduce stress induced birefringence while allowing a blue mirror to be used to enhance the projected image.

The invention includes a source lamp for providing a first beam of unpolarized white light energy and a prepolarizing beam splitter which extracts from the first beam, second and third beams. The second beam contains undesirable color components of a first polarization state, i.e., red and green, which are removed from the system by reflection to an optical dump. The third beam includes light of one color and polarization, i.e., blue prepolarized light, and white light of another polarization, i.e., S polarized light. A main polarizing prism is provided for splitting the third beam into fourth and fifth beams having the first and second polarization states respectively. The main prism effectively directs the white light to the light valve where it is modulated and returned to the main prism for projection in the conventional manner. The fifth beam being monochromatic and of the second polarization state is directed to the blue mirror where it is filtered to remove residual red and green components, altered in polarization state from the second state to the first state and altered in intensity by the preselected gradient operator before being returned to the main prism for superimposition on the light valve image. The system includes projection optics for displaying the composite image.

BRIEF DESCRIPTION OF THE DRAWINGS

The FIGURE is a simplified perspective of an illustrative embodiment of the present invention.

DETAILED DESCRIPTION OF THE INVENTION

The preferred embodiment 10 of the present invention is shown in the FIGURE. It includes a source lamp 12 which provides a beam of unpolarized white light energy. A source lamp is conventional and may be chosen to suit a particular application. Such a lamp would typically provide an output of 330 lumens to 500 lumens with power consumption in the range of 300 to 500 watts. Lens 14 is provided to collimate the output from the lamp 12. A prepolarizing prism 16 is disposed in the optical path of the lamp 12 in the collimating lens 14. While many constructions are possible, the prepolarizing beam splitter of the present invention is a polarization selective light dividing multi-refractive layer device of the type described in U.S. Pat. No. 2,403,431 to MacNeille. As disclosed in this patent, a plurality of refractive layers of thin film coating of appropriate index of refraction and thickness are deposited at the interface between two halves of a glass cube so that the layer forms a 45° angle with the intersecting sides of the cube. One or both volumes may be coated on the hypotenuse surface with an optical thin film layer which is effective to transmit all color components of the P polarized light and only the blue color component of the S polarized light. That is, the red and green color components of the S polarized light are reflected to the optical dump 18 and thereby removed from the system. To provide this performance, the interface 17 is coated with an optical thin film that includes a first layer having an index of refraction $n=1.92$ and an optical thickness of 0.912 quarter wavelength, eight sets of layers, each set having a first layer having an index of refraction $n=1.92$ and an optical thickness 0.417 quarter wavelength, a second layer having an index of refraction $n=1.35$ and an optical thickness of 2.256 quarter wavelengths and a third layer having an index of refraction $n=1.92$ and optical thickness of 0.417 quarter wavelength; and a final layer having an index of refraction $n=1.92$ and optical thickness of 0.918 quarter wavelength. This film construction data is in units of quarterwave optical depth $\lambda$ at a wavelength of 593 nanometers (nm) at 45° incidence. In this embodiment, the index of refraction of the glass is 1.55. It is to be understood that the invention is not limited to the particular construction of the prepolarizing prism. The prepolarizing prism 16 may be constructed in glass of another index or oil. It should have an appropriate coating which is effective to eliminate the red and green color components of the P polarized light.

The main prism 20 is also preferably a polarization selective light dividing multi-refractive layer device of the type described in U.S. Pat. No. 2,403,431 to MacNeille. As with the prepolarizing prism 16, the thin film coating is effective to transmit light of the first polarization, here P, and reflect light of a second polarization, here S.

A light valve 22 such as that described in U.S. Pat. No. 4,019,807 is provided for modulating the polarization state of incident light in accordance with the presence of writing light from a modulating source such as a cathode ray tube 24. The cathode ray tube 24 and the liquid crystal light valve 22 are coupled via a fiber optic faceplate 26.

A blue mirror 28 is disposed in an optical alignment with the main prism 20. Although shown as a single element, in the preferred embodiment the blue mirror 28 has a composite structure including a blue filter which passes blue light and reflects red and green light, a quarterwave plate which alters the polarization state of light passing therethrough such that light entering of one polarization exits circularly polarized and on returning as circularly polarized light exists as light of a second polarization. To reflect the polarized light back through the quarter-wave plate a blue reflecting dichroic separator is used. It prevents residual red and green S polarized light from returning to the system where it can lower contrast. A spatially graded intensity filter may also be incorporated into the blue mirror structure 28 to compensate for irregularities in the background image. Finally, the invention includes a telecentric projection lens 30 of conventional design.

In operation, the light source or lamp 12 emits unpolarized white light which is collimated by lens 14. The light exits the lens 14 and is incident upon the entrance surface of the prepolarizing prism 16 as unpolarized light. In the FIGURE, the incident light is shown as having both vertically (S) and horizontally (P) polarized components. The prepolarizing prism is coated to reflect the red and green S polarized components of the incident light to the optical dump 18. The blue S polarized component and all of the P polarized components are transmitted through the prepolarizing prism 16 to the main polarizer 20. The prepolarizer and main prism are oriented such that P polarized light at the prepolarizer is S polarized relative to the main prism and vice versa. The main polarizing prism 20 reflects the S polarized white light to the liquid crystal light valve 22 where it is modulated in polarization state and returned to the prism 20. The prism 20 also transmits the blue P polarized component to the blue mirror 28 where it is changed in polarization state from P to S and altered in intensity distribution (if the spatially graded intensity filter is utilized) before being returned to the main polarizing prism 20 as S polarized light. The main polarizing prism 20 analyzes the modulations of polarization of the light received from the liquid crystal light valve 22 and converts it to modulations of intensity and transmits the light to the telecentric projection lens 30. This is shown as a modulated P polarized wave in the FIGURE. The P polarized light incident on the blue mirror is returned as blue S polarized light to the prism 20, where it is reflected to the projection lens 30 as S polarized blue light. It thus provides the blue background for the telecentric projection lens 30.

While a preferred embodiment of the present invention has been described herein, it is understood that the invention is not limited thereto. Those having ordinary skill in the art and access to the teachings of this invention may realize other embodiments within the scope thereof. As discussed above, the prepolarizing prism may be constructed of an oil polarizer using other thin film coatings without departing from the scope of the invention. Likewise, the main polarizing prism may be of another design and construction. Further, the blue mirror may be replaced by other means for returning the blue background to the main prism. Finally, the design of the system 10 though shown for illustrative purposes herein is not critical to the invention. Other layouts may be employed without departing from the scope thereof.

What is claimed is:

1. An image projection system comprising:
   means for providing a first beam of unpolarized white light energy;
   means for splitting and prepolarizing said first beam into second and third beams, said third beam substantially consisting of a preselected color component of a first polarization state and substantially all color components of a second polarization state;
   polarizing means for splitting said third beam into fourth and fifth beams, said fourth beam consisting essentially of light of said first polarization state and said fifth beam consisting essentially of light of said second polarization state;
   color selective means mounted in the optical path of said fourth beam for changing the polarization state of a preselected color component of said fourth beam to said second polarization state and returning it to said polarizing means;
   means mounted in the optical path of said fifth beam for selectively modulating the polarization state of said fifth beam from the second polarization state to the first polarization state and returning said modulated light to said polarizing means to be recombined with light from said color selective means into a sixth beam; and
   means for projecting light in said sixth beam.

* * * * *